US007005027B2

(12) United States Patent
Valenti et al.

(10) Patent No.: US 7,005,027 B2
(45) Date of Patent: Feb. 28, 2006

(54) REINFORCED TAG AND METHOD OF MANUFACTURING

(75) Inventors: F. Paul Valenti, Barrington, IL (US); John Garber, Fenton, MO (US)

(73) Assignee: Chicago Tag and Label, Inc., Libertyville, IL (US)

( * ) Notice: Subject to any disclaimer, the term of this patent is extended or adjusted under 35 U.S.C. 154(b) by 309 days.

(21) Appl. No.: 10/209,069

(22) Filed: Jul. 30, 2002

(65) Prior Publication Data

US 2004/0022999 A1 Feb. 5, 2004

(51) Int. Cl.
*B32B 31/18* (2006.01)

(52) U.S. Cl. ...................... 156/202; 156/216; 156/234; 156/238; 156/249; 156/253; 156/265; 156/302

(58) Field of Classification Search ................ 156/196, 156/199, 200, 201, 202, 204, 216, 226, 227, 156/230, 234, 238, 247, 248, 249, 252, 253, 156/256, 265, 277, 297, 299, 302; 428/78, 428/121, 131; 40/299.01, 27, 671, 674, 675
See application file for complete search history.

(56) References Cited

U.S. PATENT DOCUMENTS 1,198,826 A * 9/1916 Dansereau ................... 40/663
1,658,328 A * 2/1928 Eastman ..................... 493/335
1,717,443 A * 6/1929 Flood ............................ 40/27
2,781,818 A * 2/1957 Beckman et al. ........... 156/202
3,031,356 A * 4/1962 Bousquet et al. ........... 156/202
3,945,870 A * 3/1976 Johnsen ....................... 156/201
4,528,055 A * 7/1985 Hattemer ..................... 156/247
4,588,463 A * 5/1986 Barber et al. ............... 156/200
4,780,974 A * 11/1988 Mitchell ....................... 40/674
5,393,366 A * 2/1995 Bell ........................... 156/443

* cited by examiner

*Primary Examiner*—Gladys J P Corcoran
(74) *Attorney, Agent, or Firm*—Wallenstein Wagner & Rockey, Ltd.

(57) ABSTRACT

A method of manufacturing reinforced tags using a press is disclosed which includes providing a continuously moving web of tag material. A web of reinforcing material is also provided and die cut into reinforcing patches. The reinforcing material has a pressure sensitive adhesive thereon. A first portion of the patches is adhered to a first major surface of the continuously moving web of tag material so it extends beyond said first major surface. A second portion of the patches is contacted with a stationary curved surface which folds the patches as they move along the folder so that the second portion is folded around an edge of the tag material and adheres to a second major surface of the web of tag material. A hole is then cut in each tag unit at a location such that it extends through the patch at a point where it is adhered to two major surfaces of each tag unit. The web of tag material is then cut into the individual tag units. The patches and the tags both have a transverse dimension which is smaller for the patches than for the tags.

6 Claims, 3 Drawing Sheets

REINFORCED TAG AND METHOD OF MANUFACTURING

FIELD OF THE INVENTION

The present invention relates to tag manufacturing, more specifically, it relates to a method of manufacturing a reinforced tag in a continuous process and a tag manufactured by the continuous process.

DESCRIPTION OF THE RELATED ART

The manufacturing of tags is a multi-step process which typically includes the steps of printing the tag, making a hole in the tag, reinforcing the hole, and trimming the tag to the proper size. While tags may be manufactured using a sheet press, they are predominantly manufactured on a web press which allows for a web of feed stock to be transformed into the final product of individual tags by undergoing a variety of processes.

Typically, the web is printed in one part of the press, a hole punched and reinforced in another part of the press, and the tag die cut to the desired shape in another portion of the press. Of these steps, the step which most limits the manufacturing speed and the materials which may be used is the punching and reinforcing of the hole, as this is generally done using a reciprocating press which simultaneously punches a hole through the tag and puts down a reinforcing patch around the hole. It is desirable to have the hole reinforced so it functions effectively when a string or other flexible member is threaded through the hole and attached to a tagged object. An unreinforced hole is more likely to tear during use, rendering the tag useless. Therefore, even though this portion of the manufacturing process slows down the overall rate of manufacture, it remains a necessary step for making high performance tags.

The reciprocating press for punching and reinforcing the hole generally includes a male and female portion which together close unto the tag surface. In between the tag and the press is the reinforcing material. The reinforcing material is generally a web of material unto which is coated an adhesive. The press cuts out a section of reinforcing material and adheres it securely to the tag, while a punch simultaneously makes a hole in the both the tag and the reinforcing patch near to the center of the patch. This method may be used to simultaneously adhere reinforcing patches to both the top and bottom surfaces of the tag if additional strength is required.

This method of manufacturing tags remains effective, but it has numerous drawbacks. One drawback, as discussed above, is the relatively slow rate of manufacture of the tags which is limited in that the web of material must come to a stop while the hole is punched and the reinforcing material applied. Another drawback is in the materials which may be used. Typically, material used in manufacturing tags and patches is paper. The press described above does not operate well when certain materials, including synthetic materials having high strength and flexibility, are used. Finally, the use of a male and female type die makes it expensive to apply reinforcing patches of different shapes due to the cost of procuring different shaped dies. These problems and others have been addressed to create the tags and the method of manufacturing said tags which are the subject of the present invention.

BRIEF SUMMARY OF THE INVENTION

A first aspect of the present invention provides a method of manufacturing reinforced tags. The method includes providing a web of tag material having first and second major surfaces moving continuously through a press. A reinforcing material is adhered onto the first major surface of said continuously moving web so that a first portion is adhered to said first major surface and a second portion extends beyond said first major surface. The reinforcing material adhered to said continuously moving web is folded along a fold line so that at least a part of said second portion is adhered to said second major surface. A hole is cut in the continuously moving web of material which extend through the reinforcing material. The web is then cut into individual tags having a hole in each.

According to another aspect of the invention, a method of manufacturing reinforced tags includes providing a continuously moving web of tag material having a first and a second major surface. A feed of reinforcing patches, each individual patch having a transverse and longitudinal dimension is also provided. The patches are intermittently adhered onto the first major surface of the continuously moving web of tag material so that a first portion of the patch is adhered to the first major surface and a second portion of said patch extends beyond the first major surface. The second portion of the patch on the continuously moving web of material is folded and adhered to the second major surface. Individual tags are then formed from the web of tag material so that each has a transverse and longitudinal dimension, and each has a folded patch thereon. The transverse and longitudinal dimensions of individual patches are less than the transverse and longitudinal dimensions of individual tags.

According to another aspect of the present invention, a continuous process for the manufacture of reinforced tags includes supplying a first web of a reinforcing material stock. The reinforcing material is cut to define discrete patch units. A continuously moving second web of tag material stock is also supplied. The discrete patch units are adhered at intervals to said continuously moving second web of tag material such that a first portion of each said patch unit is adhered to a first major surface of the tag material and a second portion extends beyond the first major surface of said tag material. The second portion of each patch unit is folded along a fold line over an edge of the tag material and adhered to a second major surface of the tag material. The second web of tag material is than formed into individual tags, each having a folded patch thereon.

According to another aspect of the present invention, a reinforced tag includes a first and second major surface and at least one edge. A reinforcing patch has a first and second portion wherein the first portion is adhered to cover an extent of the first major surface, and the second portion is adhered to cover an extent of the second major surface. The first and second portion of the tag are aligned to cover co-extensive and aligned areas on the first and second major surfaces. A hole extends through the tag and the first and second portions of the reinforcing patch.

DETAILED DESCRIPTION OF THE INVENTION

Figure 1:
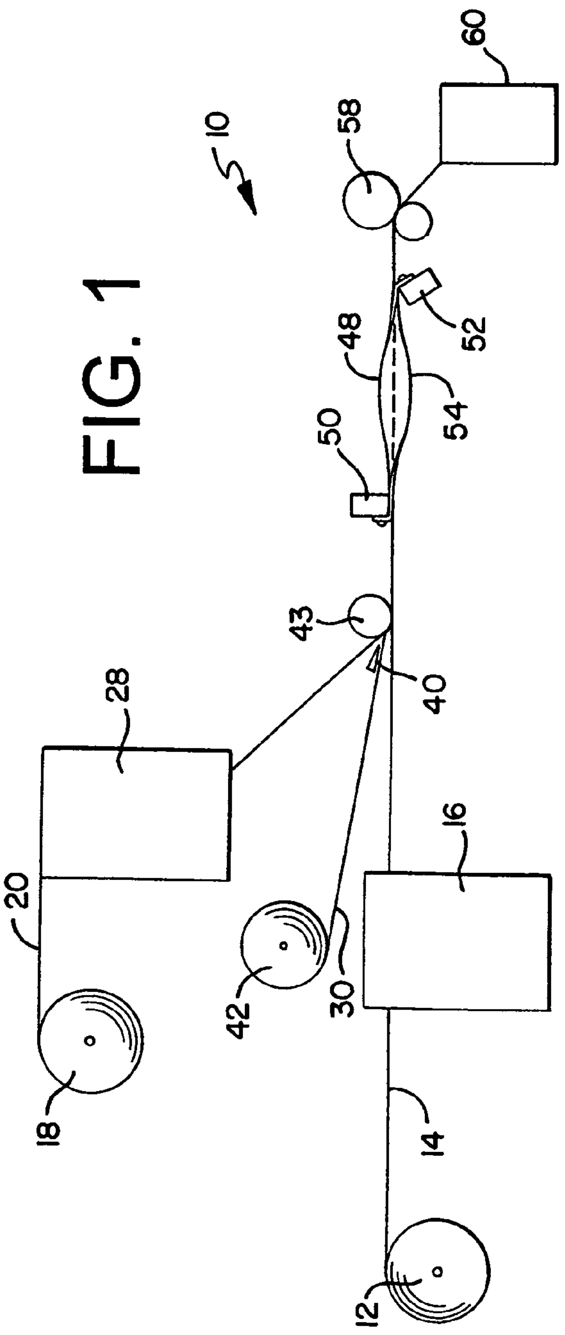
FIG. 1 is an elevation view of a press manufacturing tags according to one embodiment of the present invention.

While the invention is susceptible of embodiment in may different forms, there is shown in the drawings and will herein be described in detail preferred embodiments of the invention. It is to be understood that the present disclosure is to be considered as an exemplification of the principles of the invention. This disclosure is not intended to limit the broad aspect of the invention to the illustrated embodiments.

FIG. 1 discloses generally an in-line press with reference numeral 10 according to a preferred embodiment of the present invention. The press is preferably a rotary flexographic printing press. However, any of the presses which are well known in the art which provide for the continuous movement of a continuous web of material through the press during operation may be used. Preferably the press is an in-line press which can accomplish all of the steps of manufacturing a tag in a single pass through the press so that a feed stock can be fed to the press, and a finished tag will be produced.

A first roll 12 of a continuous web of tag material 14 is provided. The first roll 12 has a width and a roll radius. The width of the rolled material is typically in the range of from about one to about eighteen inches. Preferably, the width of the web coming off the first roll 12 defines the longitudinal dimension 11 of the tag 26 shown in FIG. 10. However, in other embodiments, the finished tag 26 may be trimmed, thereby decreasing its longitudinal dimension 11 from the original width of the first roll 12. The width, or transverse dimension 13 of the tag 26 is determined by cutting individual tags from the roll 12 at the desired tag width. Any material which can be run through the press is suitable for use as a tag material 14, and considerations such as printablility, strength, flexibility, weatherability, and cost generally determine what material is used. Preferably, the tag material used is a paper or synthetic material. Synthetic materials may include such materials as polyester, vinyl, polypropylene, and many others which are well known in the art. The thickness of the tag material is generally in the range of from two to twenty mils, preferably in the range of from about seven mils to about fifteen mils.

From the first roll 12, tag material 14 is preferably fed to a printing apparatus 16. The printing apparatus 14 repetitively prints the desired design or writing onto the tag material 14 so as each tag will have the desired design or message printed thereon. The desired design or message may be the same on each tag, or it may be different as in consecutively numbered tags. The printing apparatus 16 may optionally be adapted to print on both sides of the tag material 14. Printing apparatus 16 may also be adapted to perform other manipulations to the tag material 14, for example, applying a coating of a material to improve the printability or weatherability of the tag material. Many other treatments and manipulations of the tag material 14 which are well know in the art may be performed by the printing apparatus 16. In this embodiment, the tag material 14 is printed and then proceeds along through the press. However, in other embodiments, it may be desirable to not print on the tag material 14 at all.

Figure 10:
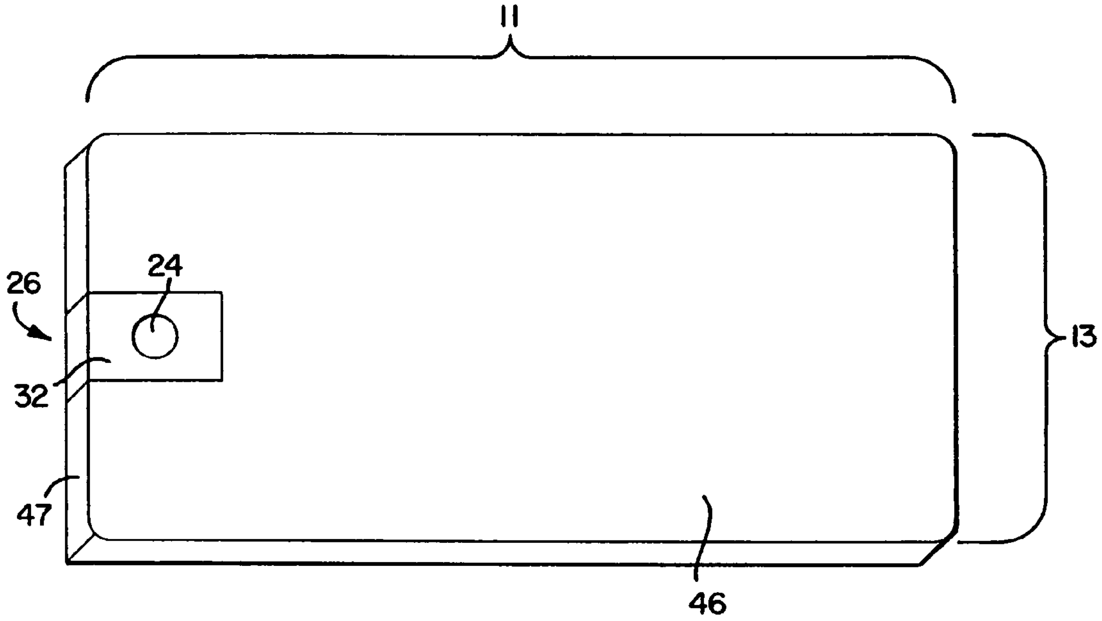
FIG. 10 is a perspective view of a reinforced tag according to one embodiment of the present invention.

In this embodiment, a second roll 18 of a reinforcing material 20 is provided. The second roll 18 includes a reinforcing material 20 and a release liner material 30 with a pressure sensitive adhesive layer between the two materials. The reinforcing material 20 and the release liner material 30 are provided in this embodiment as continuous webs removably bonded to one another. The reinforcing material 20 of the second roll 18 is preferably chosen for its ability to provide reinforcement as a reinforcing patch 32 to the hole 24, or opening, of tag 26 as shown in FIG. 10. Materials suitable for this purpose include numerous natural and synthetic materials. Preferably, the material used is a paper or synthetic. The thickness of the reinforcing material is also generally in the range of from about two to about twenty mils, preferably in the range of from about nine mils to about eleven mils.

Figure 2:
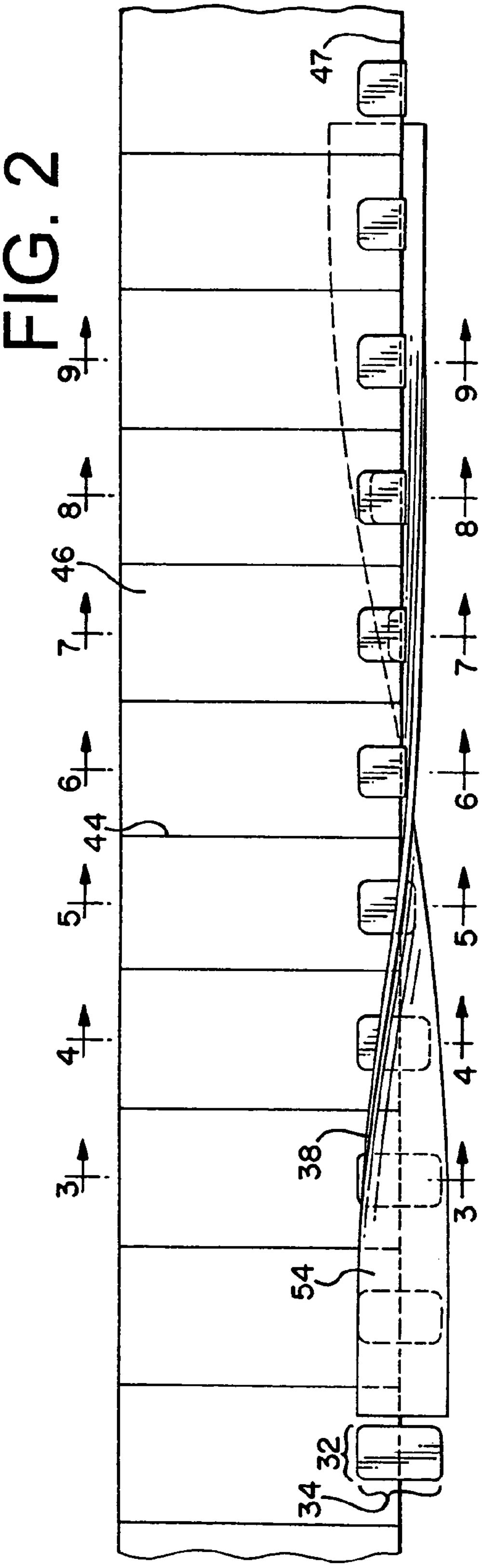
FIG. 2 is a plan view of a reinforcing patch being folded during the manufacture of reinforced tags according to one embodiment of the present invention.

The reinforcing material 20 in this embodiment is fed to a die cutting apparatus 28 where the continuous web of reinforcing material is cut into distinct patches 32 as shown in FIGS. 1 and 2. When the reinforcing material is die cut into rectangular or square patches, the width of the second roll 18 defines the longitudinal dimension 34 of the individual patches 32, and the transverse dimension 36, or patch width, is determined by die cutting the continuous web. However, a benefit of this process is that various shapes can be inexpensively and easily die cut out of the reinforcing material by simply changing the die used. Whatever shape the patches are cut into, the patches still have a transverse and longitudinal dimension. The transverse and longitudinal are then determined by their orientation to the corresponding transverse and longitudinal dimensions on the tags to which they are applied. In the die cutting apparatus 28, the continuous web of reinforcing material 20 is optionally and preferably also scored or perforated along a fold line 38. The scoring or perforating weakens the reinforcing material 20 along the fold line 38 so that it may be more easily folded. The release liner material 30 is preferably not die cut or scored.

The reinforcing material 20 and the release liner material 30 continue moving through the press 10 to an edge 40 where the patches 32 are removed. The release liner material 30 is pulled back over the edge 40 by a rotary pull and collected on a collection roll 42. Pulling the release liner material 30 back over the edge 40 causes the patches 32, which have been die cut out of the reinforcing material 20, and have a pressure sensitive adhesive thereon, to separate from the liner material 30. The patches 32 intermittently contact the tag material 14, which is in continuous movement through the press 10. Preferably, when the leading edge of the patches 32 contacts the tag material 14 it becomes adhered to the tag material 14 by the pressure sensitive adhesive on the patches 32. A nip 43 simultaneously pushes the patches 32, having the pressure sensitive adhesive, into close contact with the continuously moving tag material 14 to ensure a good bond is formed.

The position of the patches 32 on the tag according to one preferred embodiment is shown in FIG. 2, which is a plan view of the web of tag material 14 passing through the press 10. The patches 32 are applied to the tag material 14 at intervals to correspond to the individual tags 26 which will subsequently be formed from the web of tag material 14 at locations as indicated by lines 44, typically by cutting or perforating the tag material. In a preferred embodiment, a first portion of preferably one half of each patch 32 along the longitudinal dimension 34 is adhered on a first major surface 46 of the tag material 14. The second portion extends beyond the first major surface 46.

The manner in which the patches 32 of a reinforcing material 20 are intermittently applied to the continuously moving web of tag material 14 is preferably based on the difference in the relative rates of travel of the web of tag material 14 and the web of reinforcing material 12. The web of reinforcing material 12 travels at a slower rate of speed, allowing the patches 32 to be strategically placed to reinforce only the desired portion of the tags 26. The ratio between the desired transverse dimensions of the individual tags and the individual patches determines the relative rates of travel of the web of tag material 14 and reinforcing material 20. Preferably the rate of travel of the web of tag material 14 remains constant, and a feed back loop in communication with a servo motor adjusts the rate of travel of the reinforcing material 20 as required to maintain the desired placement position of the individual patches on the individual tags while the press is operating. The web of reinforcing material 20 in this embodiment preferably moves at a substantially constant rate of speed with minor variations as required to insure correct placement of the patches 32.

Placement of the patches 32 on only the required portion of the tag 26, namely that portion through which the hole 24 will be cut, allows less reinforcing material 12 to be used with the same benefits as if the reinforcing material 12 were continuously applied to the tag material 14 along an edge 47. This results in a material and cost savings, the cost portion of which is multiplied when relatively expensive synthetic materials are used instead of paper stock as a reinforcing material.

In another embodiment, reinforcing patches are provided to the continuously moving web using a vacuum cylinder. Preferably, a pressure sensitive adhesive hot melt glue is first coated onto a web of patching material. The web then travels to the hardened vacuum cylinder where it is cut into the proper patch size. The reinforcing patches are picked up by the vacuum effect of the cylinder with the pressure sensitive adhesive facing away from the vacuum cylinder. They are then rotated and intermittently placed onto a first major surface of the continuously moving web of tag material.

In another embodiment of the present invention, a roll of reinforcing material is not provided. Rather, preformed patches of a reinforcing material are provided to the press 10 for use as reinforcing patches. If the preformed patches are provided on a continuous release liner they may utilize a rotary pull, an edge, and a collection roll as described above. If they are provided individually they may utilize a vacuum cylinder to properly position the patches on the individual tags.

The tag material 14 having patches 32 adhered to the first major surface 46 continues through the press 10 to a folding apparatus 48. In this embodiment, the folding apparatus 48 includes a first base member 50 and a second base member 52. Between the first and second base members 50, 52 is a belt 54. The first and second base members 50, 52 are preferably stationary bases between which the belt 54 is tautly strung. The belt 54 is twisted as indicated in FIG. 2. The twisted belt 54 presents a continuous curved surface along which the tag material 14 having patches 32 adhered thereto can be moved. As shown in FIG. 1, the belt 54 extends from the first base member 50, which is above the continuously moving web of tag material 14, to the second base member 52, which is below the continuously moving web of tag material 14.

Figure 3:
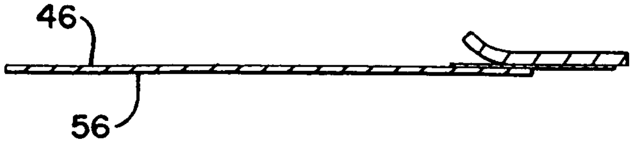
FIG. 3 is a cross-sectional view along line 3 of FIG. 2.
Figure 4:
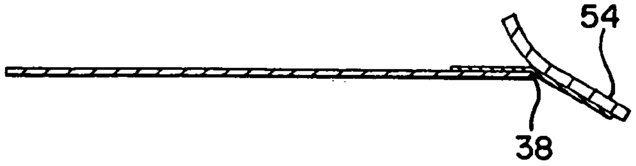
FIG. 4 is a cross-sectional view along line 4 of FIG. 2.
Figure 5:
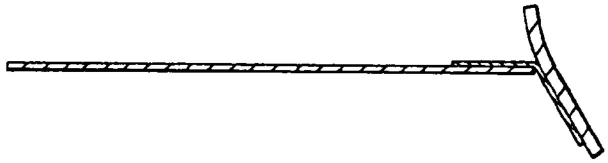
FIG. 5 is a cross-sectional view along line 5 of FIG. 2.
Figure 6:
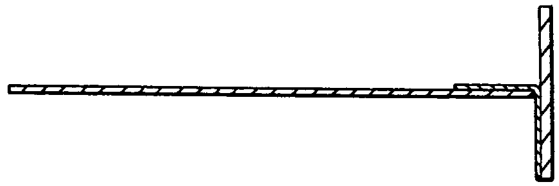
FIG. 6 is a cross-sectional view along line 6 of FIG. 2.
Figure 7:
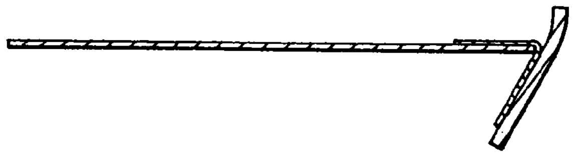
FIG. 7 is a cross-sectional view along line 7 of FIG. 2.
Figure 8:
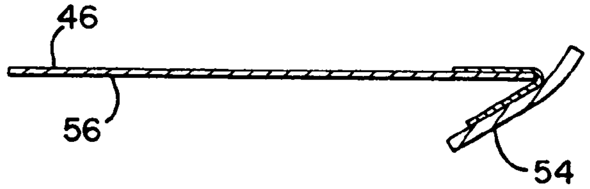
FIG. 8 is a cross-sectional view along line 8 of FIG. 2.
Figure 9:
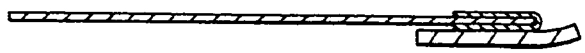
FIG. 9 is a cross-sectional view along line 9 of FIG. 2.

FIGS. 3 through 9 show a patch 32 passing through the folding apparatus 48 according to one embodiment of the present invention. The patch 32 is first adhered to the first major surface 46 of the tag material 14, as shown in FIG. 3, which is a cross-sectional view taken along line 3 of FIG. 2. The patch 32 contacts the belt 54 and begins to fold along a fold line 38. As the patches 32 move along the folding apparatus 48, they are folded progressively further by the belt 54 until the second portion of the patch 32 is contacted to the second major surface 56 of the tag material 14 as shown by FIGS. 4 through 9, which are cross-sectional views taken along lines 4 through 9 of FIG. 2. The use of a stationary curved surface, such as the belt 54, to fold the patches 32 is beneficial because it allows the web of tag material to move continuously while the folding of the patch 32 is being accomplished. The belt 54 can be replaced in other embodiments by another curved surface, such as curved plastic, metal, or wood surface. It is appreciated that the list of materials from which the curved surface could be formed is nearly unlimited. The folder is preferably stationary, and the tags in constant motion through the press.

While one preferred embodiment of a folding apparatus 48 utilizing first and second base members 50, 52 and a twisted belt 54 has been shown in the accompanying figures, it is appreciated that other types of folding apparatuses could be used to achieve the same beneficial results within the scope of the present invention. For example, the patch 32 may be folded along the fold line 38 using streams of directed air (not shown) to fold the patch 32 over the edge 47 of the tag 26. Another example may utilize a folding apparatus which moves alongside of the web of continuously moving tag material 14 and includes a jaw (not shown) which grasps and folds the patch. A movable folding apparatus or streams of directed air would allow for the tag material 14 to move along continuously through the press without necessitating stops and starts of the web, thereby preserving the rapid rate of manufacturing which is one benefit of the present invention.

In the embodiment shown in FIG. 1, after the patch 32 has been folded, holes are formed in the continuously moving web of tag material 14. As shown in FIG. 10, the hole 24 is cut so that it extends through the reinforcing patch 32. The tag material 14 passes through a cutting apparatus 58. The cutting apparatus 58 preferably includes an engraved rotary die with air eject, or a male and female punch die set for cutting a hole through the tag 26 and reinforcing material 12. While a hole is preferably cut through the reinforcing patch and the tag material, in another embodiment, a patch could be folded such that a portion of the folded patch extended beyond the boundaries of the tag material. In such an embodiment, a hole could be formed through only the patch material with similar beneficial results.

In one preferred embodiment, the final finishing step in the manufacture of the reinforced tags 26 is die cutting the tags 26 to the correct size. This includes die cutting the continuous web into individual tags, and may additionally include further trimming of the corners of the tags, or otherwise trimming the tags to the desired size. Finishing apparatus 60 preferably includes an engraved rotary die cutter which makes the appropriate cuts and collects the finished tags 26.

A finished tag according to one embodiment of the present invention is shown in FIG. 10. The tag 26 has a longitudinal dimension 11, a transverse direction 13 or width as measured at it's widest point, and an edge 47. It further includes a first major surface 46 and a second major surface opposite to the first major surface 46. A reinforcing patch 32 is adhered to the first major surface 46 and extends over the edge 47 and unto the second major surface. The reinforcing patch 32 covers substantially co-extensive and aligned areas on the first and second major surfaces. In other words, approximately one half of the patch is covering an extent of the first major surface 46, and the other half is covering the corresponding area on the second major surface. This is a result of the way in which the tag is manufactured by folding the patch 32. A hole 24 extends through the first and second major surfaces of the tag 26 and also through the first and second portions of the patch 32 which cover the major surfaces.

Figure 11:
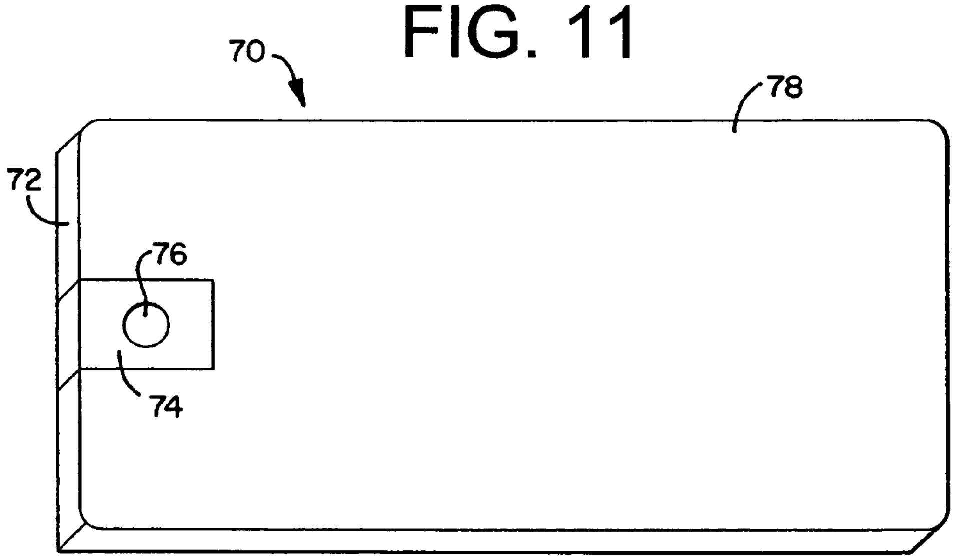
FIG. 11 is a perspective view of a reinforced tag according to another embodiment of the present invention.

Another embodiment of the present invention is shown in FIG. 11. In this embodiment, the finished tag 70 has been trimmed along an edge 72 which is proximate to a reinforcing patch 74 through which a hole 76 extends. Prior to trimming, the reinforcing patch 74 is folded over the edge 72 so that substantially co-extensive and aligned areas on a first major surface 78 and a second major surface opposite to the first major surface 78 are covered by the reinforcing patch. The tag 70 is therefore reinforced on both the first major surface 78 and a second major surface for additional strength, but has a substantially smooth edge proximate to the reinforced hole 76.

While the specific embodiments have been illustrated and described, numerous modifications come to mind without significantly departing from the spirit of the invention, and the scope of protection is only limited by the scope of the accompanying claims.

We claim:

1. A method of manufacturing reinforced tags comprising the steps of:

providing a continuously moving web of tag material having a first and a second major surface;

providing a feed of reinforcing patches wherein each individual patch has at least a transverse dimension;

intermittently adhering patches onto the first major surface of the continuously moving web of tag material wherein a first portion of the patches is adhered to the first major surface and a second portion of said patches extends beyond the first major surface;

folding the second portion of the reinforcing patches on the continuously moving web of material using a stationary folder at least partially defined by an extent of a curved surface and adhering said second portion to the second major surface;

forming the web of tag material into individual tags each having at least a transverse dimension, each of which has a folded patch thereon; and wherein the transverse dimension of individual patches are less than the corresponding transverse dimension of individual tags.

2. The method of claim 1 wherein the step of forming the web of tag material into individual tags comprises cutting the web of material.

3. The method of claim 1 wherein the step of forming the web of material into individual tags comprises perforating the web of material for later separating off individual tags.

4. The method of claim 1 wherein the step of folding the patch further comprises a curved surface at least partially defined by an extent of a twisted belt.

5. The method of claim 1 further comprising the step of forming a hole which extends through said folded patch.

6. The method of claim 1 wherein the step of providing a feed of patches further comprises the steps of:

die cutting a web of a reinforcing material to form a reinforcing patch wherein the reinforcing patch has a pressure sensitive adhesive thereon covered by a continuous release liner; and pulling the release liner over an edge causing the patch to separate from the release liner.

* * * * *